United States Patent [19]

Darcie et al.

[11] Patent Number: 4,789,980
[45] Date of Patent: Dec. 6, 1988

[54] SWITCHING TECHNIQUES FOR FDM COMMUNICATION SYSTEMS

[75] Inventors: Thomas E. Darcie, Hazlet; Michael J. Gans, Monmouth Beach, both of N.J.

[73] Assignee: American Telephone & Telegraph Company, AT&T Bell Laboratories, Murray Hill, N.J.

[21] Appl. No.: 897,341

[22] Filed: Aug. 18, 1986

[51] Int. Cl.$^4$ ............................................ H04Q 11/02
[52] U.S. Cl. ........................................ 370/57; 370/18; 370/69.1
[58] Field of Search ................ 370/57, 59, 120, 67, 370/18, 69.1; 379/59

[56] References Cited

U.S. PATENT DOCUMENTS

| | | | |
|---|---|---|---|
| 3,809,815 | 5/1974 | Reed et al. | 179/15 |
| 3,809,816 | 5/1974 | Reed et al. | 179/15 |
| 3,864,521 | 2/1975 | Delong et al. | 370/57 |
| 3,866,178 | 2/1975 | Muller et al. | 340/171 R |
| 3,912,876 | 10/1975 | Muller | 179/41 A |
| 4,382,266 | 3/1983 | Panzer | 358/86 |
| 4,564,940 | 1/1986 | Yahata | 370/57 |
| 4,697,260 | 9/1987 | Gravel et al. | 370/69.1 |
| 4,704,715 | 11/1987 | Shibagaki et al. | 370/69.1 |

FOREIGN PATENT DOCUMENTS 1182487  2/1970  United Kingdom ................ 370/57

OTHER PUBLICATIONS

MacDonald et al., Electronic Letters, vol. 14, No. 16, Aug. 3, 1978, pp. 502-503.
Hawkins et al., 6th International Conf. on Dig. Satellite Comm., Sep. 1983, Phoenix, Ariz., pp. VIII-7-13.

*Primary Examiner*—M. H. Paschall
*Attorney, Agent, or Firm*—Erwin W. Pfeifle

[57] ABSTRACT

The present invention relates to a switching technique for packet Frequency Division Multiplexed (FDM) communication systems. In the present system, each of N system users is assigned (a) either a separate fixed one of N transmit frequency channels or a selected free one of L transmit frequency channel for communications to a head-end FDM channel switching arrangement (IO), and (b) a fixed assigned separate one of N receive channels for communications from the head-end FDM channels switching arrangement. At the FDM channel switching means, all FDM channel signals received from the system users are directed into separate paths (21) through the switching arrangement. The signals in each path are demodulated (23) to baseband, and a destination address in each packet is detected (28) to determine where each packet is to be sent. Each path in the switching arrangement is hardwired therethrough to an associated transmitting oscillator (29) which is frequency tuned, by means of the detected destination address, to the unique frequency channel of the user or the external network which is the desired destination of the packet. Thus, switching of a packet signal is accomplished without ever connecting or disconnecting wire lines.

21 Claims, 6 Drawing Sheets

SWITCHING TECHNIQUES FOR FDM COMMUNICATION SYSTEMS

TECHNICAL FIELD

The present invention relates to a Frequency Division Multiplexed (FDM) switching technique for use in optical or radio communication systems such as, for example, Local Area Networks (LANs). More particularly, each system user's transmitter and receiver is fixed or selectively assigned to a predetermined unique frequency channel. A central station demodulates all transmitted signals received by that station to baseband and determines from an address portion of each message to which receiver the message is to be sent. Each baseband signal can be hard-wired to its transmitting oscillator which is frequency tuned by the received address portion to the unique frequency channel of the desired receiver.

DESCRIPTION OF THE PRIOR ART

Every type of communication system interconnecting more than two users depends on some form of switching to efficiently route information among the vazious users. With Frequency-Division-Multiplexing (FDM), various techniques for centralized and non-centralized routing have been used. One routing technique is to provide a switching array which switches multiple signals at either baseband or at an intermediate frequency (IF) which were received and/or are to be transmitted as FDM signals over a transmission medium. In this regard see, for example, U.S. Pat. No. 4,382,266 issued to K. Panzer on May 3, 1983, or the article by R. B. Hawkins et al. in *Sixth International Conference On Digital Satellite Communications*, Sept. 19-23, 1983, Phoenix, Ariz., at pages VIII-1-7. Similarly, the article by R. I. MacDonald et al. in *Electronic Letters*, Vol. 14, No. 16, Aug. 3, 1978, at pages 502–503 illustrates a optoelectronic switching array which switches signals already modulated on their FDM carriers from the inputs of the switch to the outputs thereof using a light-emitting diode for each incoming channel and associated selectively operated photodiodes connected to separate output lines.

Another technique is disclosed in U.S. Pat. Nos. 3,866,178 issued to J. J. Muller et al. on Feb. 11, 1985, and 3,912,876 issued to J. J. Muller on Oct. 14, 1975, for an FDM switching system wherein Radio Frequency (RF) transmitters and receivers are each coupled to their associated antenna within a common switching room. The switching room, which is electromagnetically isolated from outside space, permits the simultaneous RF signal exchange between all antennas of the different transmitters and receivers by a frequency tuning technique.

A further FDM transmission technique is to avoid centralized switching as disclosed, for example, in U.S. Pat. Nos. 3,809,815 and 3,809,816 issued to J. Reed et al. on May 7, 1974. There, a synthesizer in each subscriber station is operated from a common reference frequency received from the transmission medium, and each station is assigned a fixed home frequency at which it transmits information. When calling another subscriber, the synthesizer within the calling station adjusts the transmit frequency of that station to correspond to the assigned receive frequency of the called station, which automatically adjusts the receive frequency of the calling station to correspond to the transmit frequency of the called station.

Centralized switching, discussed above, has certain advantages over subscriber area switching by, for example, including less equipment in the overall system. However, although centralized switching might be preferred, the individual switches tend to add noise and the overall switching array becomes increasingly bulky as it grows in size. The problem remaining in the prior art, therefore, is to provide a centralized switching technique which does not introduce noise and avoids the bulky nature of prior art switching matrices.

SUMMARY OF THE INVENTION

The foregoing problem in the prior art has been solved in accordance with the present invention which relates to a Frequency Division Multiplexed (FDM) switching technique for a radio or lightwave communication system such as, for example, a Local Area Network (LAN). More particularly, each system user's transmitter and receiver is selectively or fixedly assigned to a predetermined unique frequency channel. A central station demodulates all of the signals transmitted by the various users of the system and received by that station to, for example, baseband and determines from an address portion included in each message to which user it is to be sent. Each demodulated baseband signal in the central station can be hard-wired to its separate transmitting oscillator, which oscillator is frequency tuned by the received address portion of each user's message to the unique frequency channel of the desired receiver, for transmission to the desired user receiver via the transmission medium.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 3:
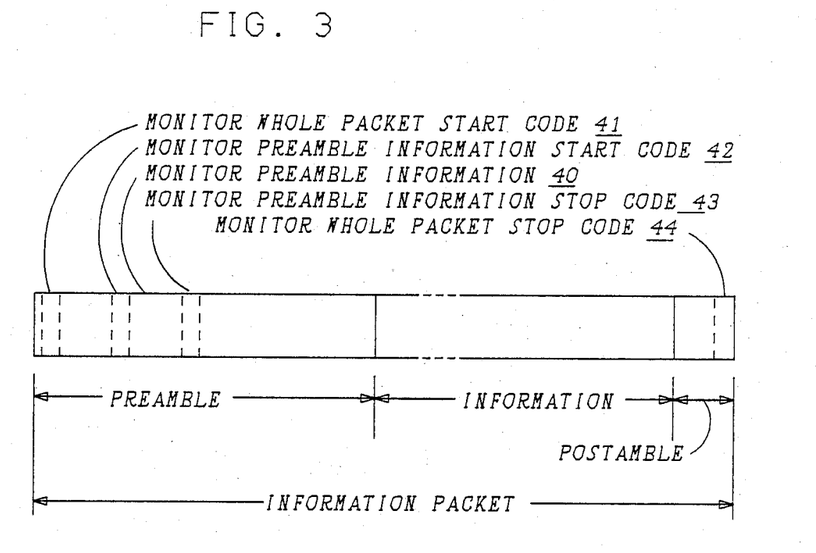
FIG. 3 is an exemplary arrangement of a packet of information transmitted by a user of the system.

The present invention relates to a technique for transferring or switching signals between users of a Frequency-Division-Multiplexed (FDM) switched system which can serve carrier media in the form of an optical Local Area Network (LAN) using either optical FDM (wavelength division multiplexing) or microwave subcarrier multiplexing. It is to be understood that the present switching technique can also be employed in other types of communication switching systems as, for example, in microwave systems. For purposes of explanation only of the present invention and not for purposes of limitation, it will be assumed hereinafter that the communication system practicing the present invention is a packet switching system wherein a destination address is included, for example, near the beginning of a preamble of each baseband information packet signal to indicate the unique destination address, or user, to which the information signal is to be delivered. A typical format for a packet signal in the time domain, which will be used in the following system description, is shown in FIG. 3.

Figure 1:
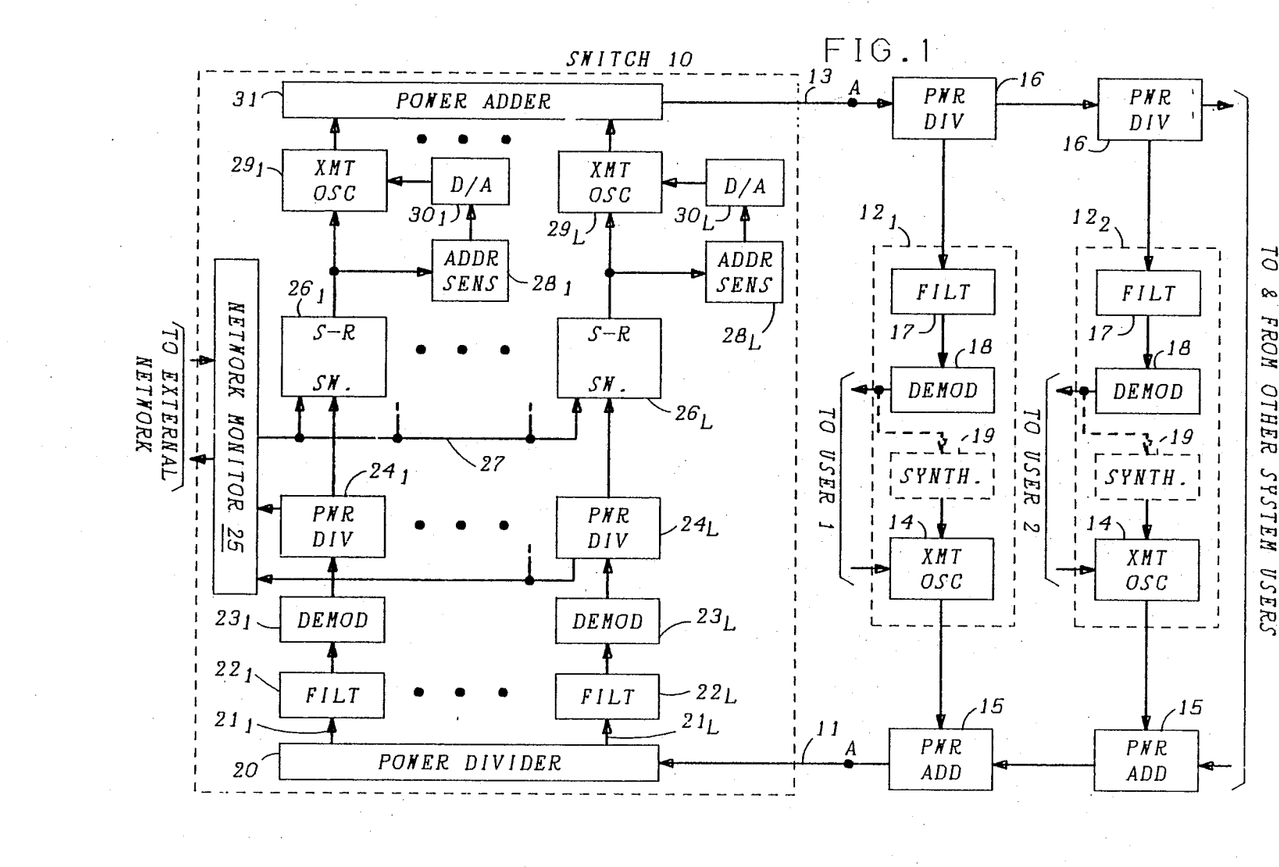
FIG. 1 is a block diagram of a centralized FDM switching arrangement for use in a lightwave or radio system in accordance with the present invention.

FIG. 1 is a block diagram of an FDM packet communication system in accordance with the present invention which includes a plurality of N users and their associated transceivers $12_1$ to $12_N$, and a head-end channel switching means 10. For purposes of simplicity, only the first two transceivers $12_1$ and $12_2$ are shown. Each active user of the system transmits the associated packet signals to the destined user of the system, or to an external network, via a separate associated one of transceivers $12_1$ to $12_N$ and transmission medium 11 using a separately assigned FDM channel. The system includes a head-end FDM channel switching means 10 which receives the concurrent FDM signals propagating on transmission medium 11 and retransmit these FDM signals to the appropriate destined users of the system, via a transmission medium 13, or to the external network, if the destination address so indicates, using direct links between the inputs and outputs of channel switching means 10 as will be described in greater detail hereinafter. For purposes of discussion only, transmission mediums 11 and 13 will be considered to be optical lightguides and the signals propagating therein to be lightwave signals. It should be understood that transmission mediums 11 and 13 could also take other forms such as, for example, a coaxial cable or even air propagating, for example, electronic signals. In such case, the electronic signal from each transceiver 12 could be converted to a lightwave signal (a) before being added to other lightwave signals in transmission medium 11, e.g., in power adder 15, or (b) after all FDM microwave signals had been combined in transmission medium 11, e.g., at point A in FIG. 1. Such technique similarly applies for transmissions on transmission medium 13 for converting the lightwave signals on medium 13 to microwave signals for delivery to each transceiver 12.

In the present FDM communication system, each user is assigned a separate fixed frequency channel in the overall frequency spectrum of the system for receiving packet communication signals from transmission medium 13, and either a separate fixed or selectively assignable frequency channel for transmitting FDM signals on transmission medium 11 as will be described in more detail hereinafter. When communicating with another user of the system, or the external network, each user sends a packet of information, with the general format shown in FIG. 3, in the baseband to a transmit oscillator 14 in the transmitter portion of that user's transceiver $12_i$. Transmit oscillator 14 functions to up-convert the baseband packet signal to the appropriate FDM channel which has been either permanently or temporarily assigned to that user, as will be explained in greater detail hereinafter. The up-converted signal from that user is added, via a coupler or power adder 15, to the FDM signals from other users of the system which are propagating along transmission medium 11 towards channel switching means 10. The FDM signals propagating along transmission medium 11 are received in channel switching means 10 by a power splitter 20 which divides the power of the received FDM signals equally among each of L paths $21_1$ to $21_L$, where $L \leq N$.

The following description relates to the functioning of a system configuration under the condition where L=N. Under such condition, there are an equal number of (1) paths 21 in channel switching means 10 and (2) transceivers 12, and each of the transmitting oscillators 14 in transceivers $12_1$ to $12_N$ transmits its FDM signal using a separate fixed assigned frequency channel. This fixed separate FDM transmitting channel used by transmitting portion of a transceiver 12 can correspond to the fixed assigned separate frequency channel used for receiving signals in that same transceiver from channel switching means 10 via transmission medium 13 and destined for the associated user. Where L=N, each of the N paths 21 in channel switching means 10 includes a filter $22_i$ which is tuned to pass only the frequency band of the fixed assigned transmitting channel of a separate one of transceivers $12_1$ to $12_N$. In other words, since there are N paths 21 in channel switching means 10, each of the paths $21_1$ to $21_N$ is assigned, or tuned, to receive and process only the transmissions from transceivers $12_1$ to $12_N$, respectively, and to route such transmissions to transmission medium 13, using the appropriate fixed assigned FDM receive channel of the destined user, or to the external network depending on the destination address in each packet.

Whenever filters are used for reception, it is understood that this includes the use of wavelength selective couplers, heterodyne receiver with assigned local oscillator frequency, etc. The output from a filter $22_i$ in a path $21_i$ is demodulated to an electrical baseband signal in an associated separate demodulator $23_i$, which baseband signal is delivered to an associated separate signal power divider $24_i$. The power divider $24_i$ in each path functions to split the power of the input signal equally between the output paths to (1) a network monitor 25 and (2) one input of a separate associated self-routing switch $26_i$.

Network Monitor 25 includes a microprocessor and memory (not shown) which functions to receive the packets at the outputs of power dividers $24_1$ to $24_L$ and detect which of paths 21 include active transmissions and where their transmissions are destined. From such active user and path detections, network controller 25 maintains an updated list of all active and non-active transceivers 12 and, when required, a list of all available transmit FDM channels. The available list of active/inactive users can be provided to all of the system users, if desired, by, for example, inserting such information as part of a transmitted preamble to each receiver to avoid the initiation of a call that conflicts with an already active user. This list of active/inactive users can be introduced into, for example, the monitor preamble section 40 of every packet by the associated self-routing switch $26_i$ via the connection 27 from network monitor 25 before transmission to the appropriate user over transmission medium 13.

A more preferable method, however, would be for network monitor 25 to recognize the first packet received from a prior inactive user on transmission medium 11, and compare the destination address received in the packet with the active/inactive user list in memory. If the destined user is inactive, network monitor 25 permits the packet to proceed through the associated path 21 to transmission medium 13. If the destined user is presently active, network monitor 25 causes a busy signal, and the originating user's destination code, to be introduced into the appropriate portions of the packet via lead 27 for subsequent transmission back to the originating user in that user's assigned FDM receive channel via transmission medium 13 and that user's receiver.

Network monitor 25 in receiving the packets from all paths 21, can also compare the destination address included in the received preamble with that of the address associated with the external network and, if it matches, to route such packet to the external network. Similarly, if a packet arrives from the external network or one of the system users, network monitor 25 checks the included destination address in the preamble of the received packet and then inserts the appropriate destined user's address code in monitor preamble information section 41 and a unique monitor whole packet start code in the preamble portion 41, as shown in FIG. 3, corresponding to the unique start code of the appropriate one of the L self-routing switches $26_1$ to $26_L$. Monitor 25 then routes the packet via lead 27 to the self-routing switches 26.

Figure 4:
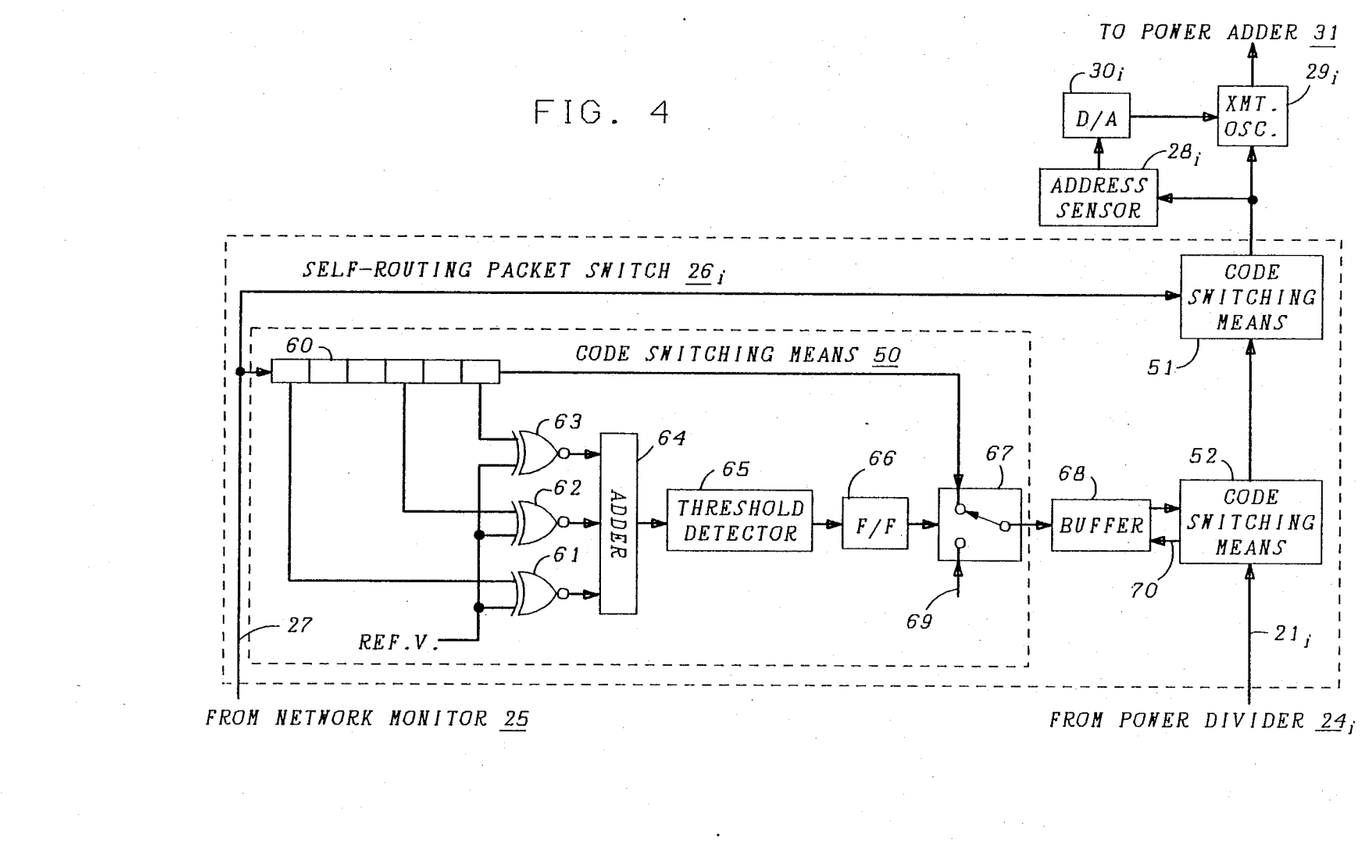
FIG. 4 is an exemplary arrangement for the self-routing packet switch in FIG. 1 when used in a digital packet switching system.

As shown in FIG. 4, each self-routing switch $26_i$ receives signals on lead 27 from network monitor 25 in separate code switching means 50 and 51. As shown in code switching means 50, the input signal from network monitor 25 is received in a shift register 60. As the bits of the received information are shifted through register 60, certain of the momentarily stored bits, as, for example, bits 1, 4 and 6 of a six bit register 60 are delivered to negative Exclusive-Or (EX-OR) gates 61-63, respectively. The length of shift register 60 and the choice of the bits therein to be delivered to separate negative EX-OR gates in code switching means 50 are determined by the length and the unique monitor preamble information start code, respectively, which is included in section 42 of the preamble of a packet that identifies the particular self-routing switch $26_i$ for which the monitor preamble information in preamble section 40 it is meant. This same monitor preamble information start code is included by network monitor 25 in preamble section 43 for the monitor preamble information stop code. Preamble sections 42 and 43 will be found immediately before and after the monitor preamble information section 40 and cause the monitor preamble information in section 40 to be inserted into a packet propagating on path 21.

Each of negative EX-OR gates 61-63 functions to compare the input bit from register 60 with a predetermined reference voltage. Such reference voltage can correspond to that of a logic "1" or "0" that may be received from register 60. If both inputs to a negative EX-OR gate are the same, a logic 1 voltage level will be produced at its output, while if the two inputs do not match a logic zero voltage level will be produced at the output. The output signals from EX-OR gates 61-63 are added together in adder 64 and the resultant output signal is delivered to threshold detector 65. Threshold detector 65 checks the level of the input signal from adder 64 and produces an enable signal to the input of a flip-flop (F/F) 66 if the input level is equal to or above a predetermined threshold.

F/F 66 can comprise the well-known Flip-flop "T", which is defined in the book "*Reference Data For Radio Engineers*", 5th Edition, 1968, published by Howard W. Sams & Co., Inc., and has only one input, where a pulse appearing on the input will cause the F/F to change states. Therefore, on a first enable pulse, F/F 66 will produce an output with a first logic value, e.g., a logic 1, and on a next enable pulse F/F 66 will produce an output with a second logic value, e.g., a logic 0, and then return again to the first logic value on the next pulse, etc. A switch, or gating means, 67 functions to connect the output from shift register 60 to the input of a buffer 68 when the enable signal from F/F 66 is at the first logic value, and to connect the unused input 69 of switch 67 to the input of buffer 68 when the enable signal from F/F 66 is at the second logic value. Buffer 68, therefore, stores the signals from shift register 60 during the time it is connected thereto by switch 67.

In operation, code switching means receives the signals from network monitor 25 over lead 27 and has the shift register 60/negative EX-OR gates 61-63 combination set up to provide a signal level from the adder which is equal to or above the threshold level used for comparison purposes in threshold detector 65 whenever the bits momentarily stored in shift register 60 match the reference voltage of all of the negative EX-OR gates 61-63. Preferably, this is set up to occur when the monitor preamble information start and stop codes in preamble sections 42 and 43, respectively, are matched with the unique code for the code switching means 50 in a desired separate one of self-routing switches $26_1$ to $26_L$. If the preamble sections 42 and 43 do not match the unique start/stop code for switching means 50, then buffer 68 will not receive any packet information and be empty for that packet period.

The code switching means 51 and 52 comprise a similar arrangement to that shown for code switching means 50, except that their shift register/negative EX-OR gates combination may be arranged to recognize the same or a different start/stop code. More particularly, code switching means 52 receives the packet signals from power divider $24_i$ in the path $21_i$ and during the each packet period. If the monitor preamble information start and stop codes, in sections 42 and 43 of the packet on path $21_i$, correspond to the proper start/stop codes of code switching means 52, then code switching means 52 will generate an enable signal from its F/F 66 both to its switch 67 and to buffer 68 on lead 70. Such enable signal causes buffer 68 to be connected to path $21_i$ during the period when the monitor preamble information from power divider $24_i$ reaches code switching means 52 in order to introduce the monitor preamble information currently stored in buffer 68 into preamble section 40 in place of the preamble information that may have been included in the packet from power divider $24_i$.

Code switching means 51, on the other hand, functions to check the monitor whole packet start and stop codes in preamble section 41 and postamble section 44, respectively. If the start and stop codes match the unique start and stop codes assigned to each self-routing switches $26_1$ to $26_L$, then code switching means 51 permits the entire packet information between the whole packet start and the stop code to be routed onto path $21_i$ in place of the packet information arriving from code switching means 52. This condition generally occurs when a user is communicating with the external network and the packet received over transmission medium 11 is routed by network monitor 25 to the external network and is not to be transmitted to any user over transmission medium 13. For such condition, code switching means 51 blocks such packets from reaching transmission medium 13 and causes the packets from the external network to be routed to transmission medium and the appropriate user for achieving two-way communications. When one system user is communicating with a second system user, however, the packet from transmission medium 11 passes through code switching means 52, while introducing any monitor preamble information in section 40, and then through code switching means 51 to transmission medium 13. The outputs from self-routing switches $26_1$ to $26_L$ are received by both address sensors $28_1$ to $28_L$ and transmit oscillators $29_1$ to $29_L$, respectively.

Addresses sensors $28_1$ to $28_L$ function to extract the user's destination address from the preamble of the received packet and to send such address to a digital-to-analog (D/A) converter $30_1$ to $30_L$, respectively. D/A converters $30_1$ to $30_L$ convert the received user's destination address into an appropriate control signal for transmission to transmit oscillators $29_1$ to $29_L$, respectively. The control signal from D/A converter 30 is used to appropriately adjust the carrier of the associated transmit oscillator 29 so that the packet is transmitted at the assigned fixed receive frequency of the destined user's receiver as determined from the destination address in the preamble. All of the FDM packet signals transmitted by transmit oscillators $29_1$ to $29_L$ are combined into one FDM signal by power adder 31 for transmission via transmission medium 13 to all of transceivers $12_1$ to $12_N$. It is to be understood that the transmit oscillators may be microwave oscillators, oscillating lasers, wavelength tunable lasers, etc.

A portion of the combined FDM signal power propagating along transmission medium 13 is coupled out at each transceiver 12 via a power divider, or coupler, 16 with the remaining major portion of the power continuing along transmission medium 13 to the next power divider 16. At each of transceivers $12_1$ to $12_N$, the signal coupled out by the associated power divider 16 is received by a filter 17 which is tuned to pass only the packets of information received in the fixed assigned receive channel and to block all other channels. The received packets from associated filter 17 are demodulated to an electrical baseband signal by demodulator 18 and transmitted to the associated user.

For the case where L<N, it is preferable that the transmit oscillators 14 in transceivers $12_1$ to $12_N$ are each selectively tunable to any one of L FDM transmit channel frequencies via control signals from an associated synthesizer 19, and that the filters $22_1$ to $22_L$ in FDM channel switching means 10 are each tuned to pass only a separate predetermined one of the L FDM channels received from transmission medium 11. Alternatively, the transceivers $12_1$ to $12_N$ can be separated into groups with each group being fixedly assigned, similar to a party line format, to one of the L possible FDM transmit channels. For the condition where the transceivers 12 are selectively tunable to any one of the L transmit frequencies, one of the L channels is preferably made a signaling channel for use in call set-up. The N transceivers 12 are, therefore, contending for the remaining lesser number of L-1 paths through channel switching means 10 for normal communications. It should be understood that the ratio of N:L can be determined from estimates of time vs. system usage to provide no blockage or a predetermined minimal amount of blockage through channel switching means 10 during times of high traffic.

In a preferred method for call set-up, a transceiver $12_i$ transmits to channel switching means 10 a packet in the signaling channel, e.g., channel L, wherein the preamble includes that user's address and the address of the destined user. At channel switching means 10, network monitor 25 detects such call initiation unless two or more transceivers are simultaneously sending call set-up packets over the signaling channel. If the indicated called party is not busy and one of the L-1 transmit channels is free, monitor 25 marks such free transmit channel as being used and transmits the code of this assigned transmit channel back to the transceiver initiating a call in its fixedly assigned FDM receive channel. Such assigned transmit channel code is sent back to the call-initiating transceiver $12_i$ in the monitor preamble information section 40 of the preamble. Where simultaneous call initiation requests are received by network monitor 25, it will not be able to detect the transceiver address or destination address of either request because of interference, and does not send a packet back to either transceiver. When the requesting transceivers do not receive a response within a predetermined period of time, they will reinitiate the call set-up request until a response is received from network monitor 25.

At a transceiver $12_i$ which is idle and desires to initiate a call, its synthesizer 19 is initialized to provide a control signal to the associated transmit oscillator 14 which causes oscillator 14 to transmit the call set-up information to channel switching means 10 over the signaling channel. When network monitor 25 responds over transmission medium 13 with a packet indicating the code of the assigned transmit channel in that transceiver fixed assigned receive channel, synthesizer 19 detects the transmit channel code in the preamble section 40 of the received packet and provides a corresponding control signal to transmit oscillator 14 to tune oscillator 14 to the assigned one of L transmit channels.

Figure 2:
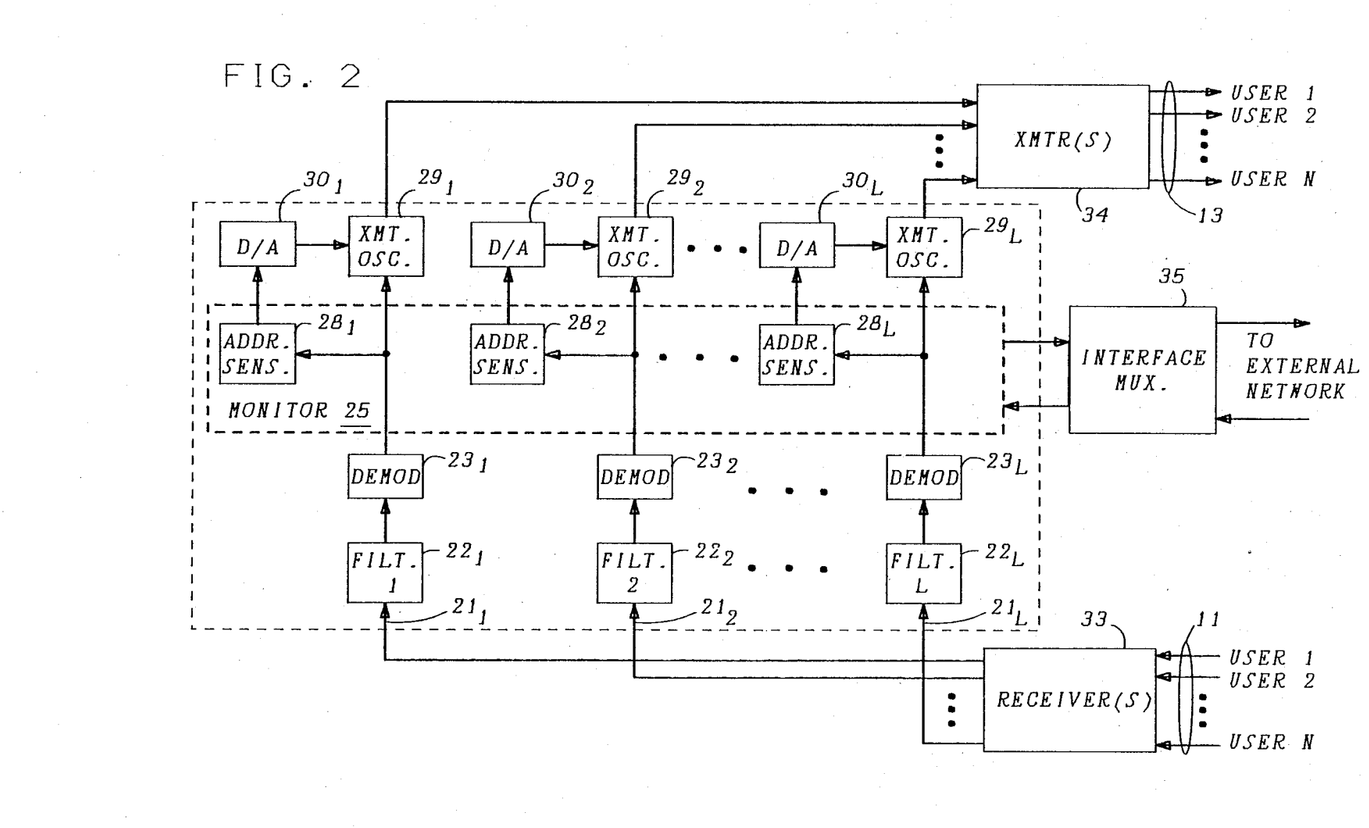
FIG. 2 is a block diagram of a centralized FDM switching arrangement for use in a lightwave or radio communication system which multiplexes user signals onto one or more carriers in accordance with the present invention.

FIG. 2 is an arrangement similar to FIG. 1 for providing a head-end FDM channel switching means 10 which can control traffic in a LAN using microwave or optical multiplexed communication with transceivers 12 over transmission mediums 11 and 13. Incoming multiplexed signals from transceivers $12_1$ to $12_N$ on transmission medium 11, which is, for example, air or a coaxial cable for the microwave system or a lightguide for an optical system, are received in a receiver 33. Receiver 33 can comprise L separate receivers, with each receiver being capable of receiving a separate one of the L possible user signals multiplexed on transmission medium 11, or a single receiver capable of receiving all L multiplexed user signals channels on transmission medium 11 and delivering the multiplexed user signals 1-L to paths $21_1$ to $21_L$, respectively. Where L=N, there are N separate receivers 33 with each receiver tuned to a separate one of the N possible multiplexed user signals and connected to the appropriate separate one of paths $21_1$ to $21_N$ or one receiver 33 capable of receiving all N multiplexed user channels and delivering the signals for propagation over the associated path 21. Where L<N, there would be only L receivers 33 coupled to L paths 21 or one receiver 33 capable of receiving all L possible multiplexed user signals from medium 11 and delivering those signals onto the associated path 21. Either technique (where L=N or L<N) functions as described previously for the arrangement of FIG. 1.

As shown in FIG. 2, a filter $22_i$ in each path $21_i$ functions to pass only a separate one of the L possible received multiplexed user signals and to block all other signals. The demodulator $23_i$, address sensor $28_i$, D/A converter $30_i$ and transmit oscillator $29_i$ in each path $21_i$ function in the same manner as described for the corresponding components in FIG. 1. More particularly, in each path $21_i$, demodulator $23_i$ demodulates the received signal to baseband and the baseband signal is routed directly to its associated transmit oscillator $29_i$ and transmitter(s) 34 through network monitor 25. As with receiver(s) 33, transmitter(s) 34 can comprise L separate transmitters with each transmitter associated with a separate one of paths $21_1$ to $21_L$, or the signals from the L paths can be combined as shown in FIG. 1 with a power adder 31 and the combined signals transmitted by one transmitter 34.

In FIG. 2 the address sensors $28_1$ to $28_L$ are shown as part of network monitor 25, where each sensor extracts the destination address of the received signal in the associated path 21. This address information is used to tune the associated transmit oscillator $29_i$ to the frequency of the intended destined user in the manner described for the corresponding components in FIG. 1. Communications to and from locations outside the system can be accomplished through network monitor 25 by directing the received signal to or from a network interface multiplexer 35 which interconnects the present system to an external network.

As shown in FIGS. 1 and 2, the present arrangements direct signals in an FDM system by demodulating all signal inputs to a switch 10 to baseband and detecting where the signal is to be sent. Each baseband signal can be hard-wired to its transmitting oscillator 30 which is frequency tuned, by means of the address-portion information of the signal, to the frequency of the transceiver 12 which is the desired destination of the signal. Thus switching is accomplished without ever connecting or disconnecting wire lines. In addition, various control and other information can be added or changed in all baseband signals in switch 10, e.g., a list of all busy users or information from an external system. Such hard-wired switching method is very economical because a minimum of equipment is required for each of the many users. For example, each user can be designed to receive only one fixed carrier frequency and to transmit only one fixed carrier frequency, where L=N. The switching method avoids multiple stage interconnections and disconnects and their blocking constraints, noise transients, cross-talk, circuit topology complications, etc. Such system is particularly suited to fiber optic LANs which have wide bandwidth suited for FDM, but it is to be understood that the present invention could be used with other systems such as microwave or infra-red communication systems or combinations of such systems.

Although the present invention has been described for a packet switching system, it should be understood that the present invention can also be practiced using other techniques. For example, network status and address information can alternatively be communicated within the network by means of pilot tones which are entirely analog instead of the previously described packet control signals which are digital. For the case of pilot tone control signals, the arrangement of self-routing switch $26_i$ of FIG. 4 would have to be modified as shown in FIG. 5.

Figure 5:
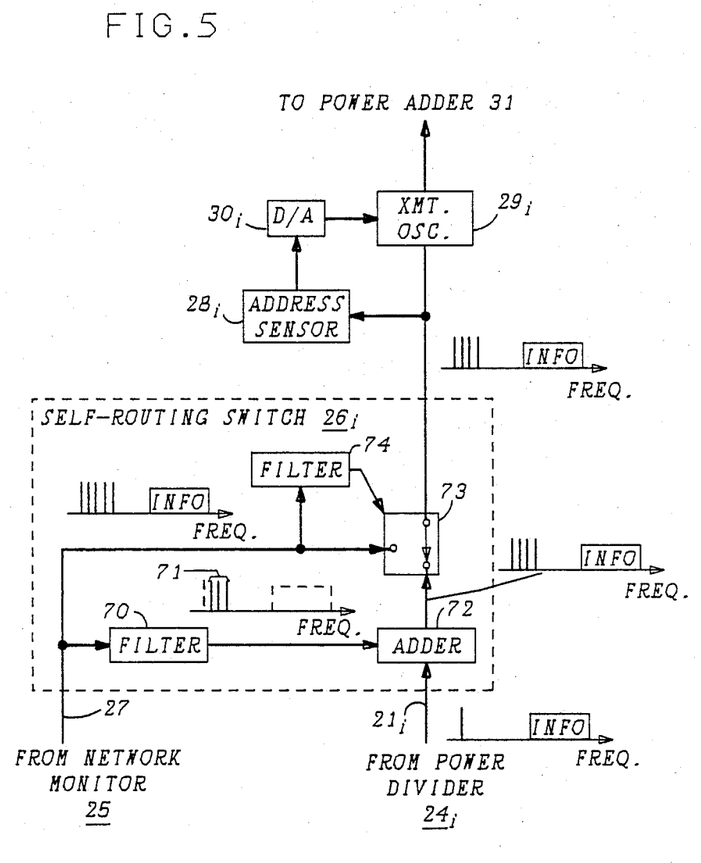
FIG. 5 is an exemplary arrangement for a self-routing switch in FIG. 1 for use in an analog switching system.

In FIG. 5, if network monitor 25 is to add control information into a signal arriving from power divider $24_i$, as performed by elements 60–68 of FIG. 4, then network monitor 25 transmits the control information, for example, via appropriate pilot tones within the frequency band passed by filter 70 in self-routing switch $26_i$. Any pilot tone control signals 71 passing through filter 70 are added to any control pilot tones and the analog information signals already coming from power divider $24_i$ on lead $21_i$ within adder 72. This combined analog information signal then proceeds through switch 73 to address sensor $28_i$ which recognizes the address pilot tone for a particular user and sends the appropriate control information to transmit oscillator $29_i$ in the manner outlined before. If, however, the information from network monitor 25 is to replace the entire information signal arriving on lead $21_i$ from power divider $24_i$, then network monitor 25 transmits a unique pilot tone signal which is passable by a filter 74 in the appropriate self-routing switch $26_i$ at the start of a transmission. This pilot tone control signal activates switch 73 in the associated self-routing switch $26_i$ to connect the information signal propagating on lead 27 from network monitor 25 to the output of self-routing switch $26_i$. The information signal from network monitor 25 includes the necessary address and other pilot tone control signals and the information destined for the particular user as identified by the included pilot tone address signal. Again address sensor $28_i$ detects the destination address by the included unique pilot tone address and sets transmit oscillator $29_i$ to the frequency assigned to that user. Alternatively, each user could transmit the address information on a separate FDM signaling channel. In such case, switch 10 need only detect the address channel for converting the associated information signal to that of the destined user.

Figure 6:
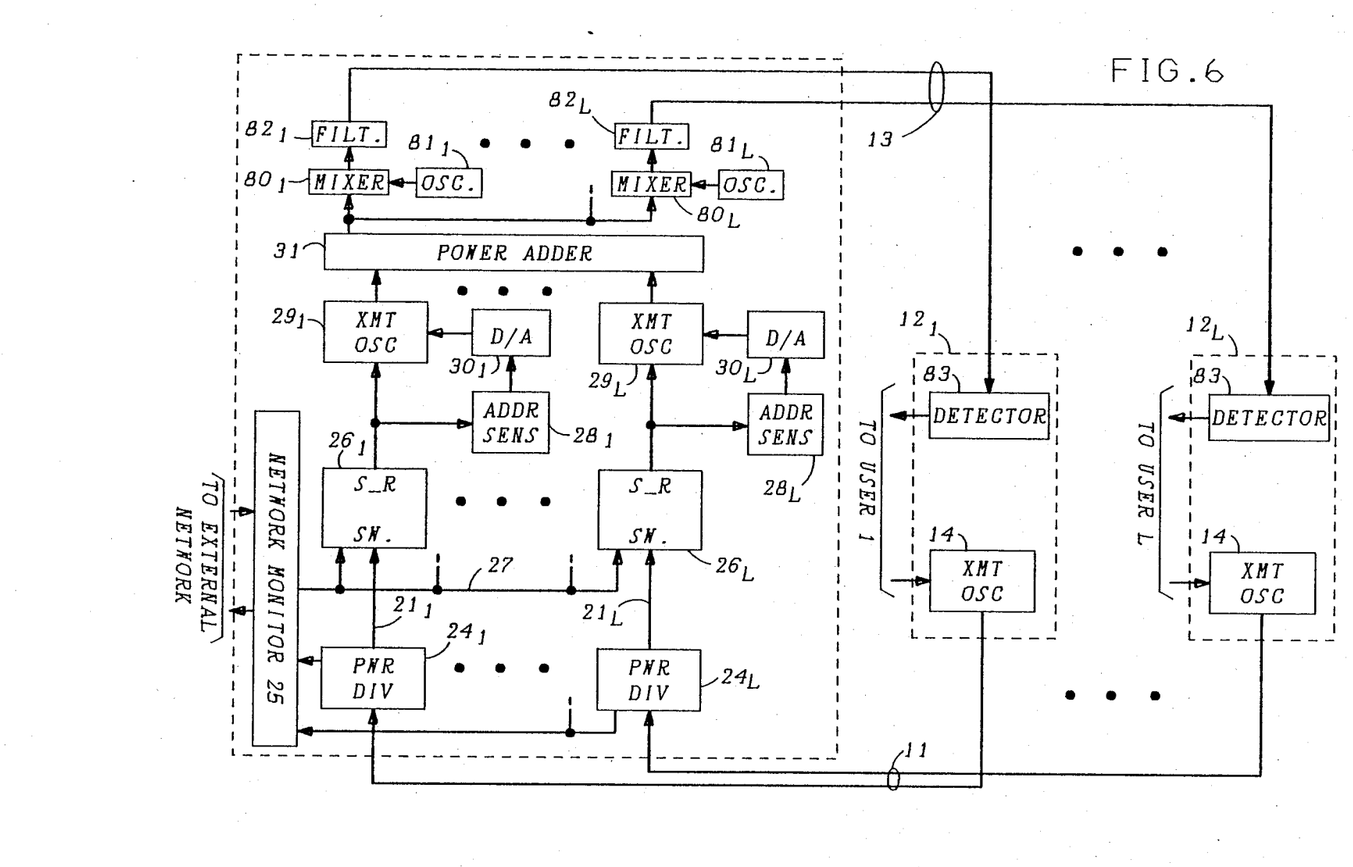
FIG. 6 is a block diagram of a centralized FDM switching arrangement in a Star-type LAN configuration.

The present switching arrangement could also be practiced in a Star-type LAN configuration as shown in FIG. 6. There, transmission mediums 11 and 13 comprise, for example, separate optical fibers, or leads, from each user. Each user transmits its optical or electrical signal including the address of the destined user. Each exemplary optical fiber or lead of transmission medium 11 is shown as being terminated in the associated power divider $24_i$ which functions as described before to divide the input signal and provide such signal to path $21_i$ and network monitor 25. The remaining circuitry functions as described hereinbefore for corresponding elements of FIGS. 1 and 2. However, to direct each of the combined FDM information signals back to the destined users over the dedicated optical fibers or leads, where each of the transceivers $12_1$ to $12_N$ expects to receive its signal at a same frequency band over transmission medium 13, the FDM output signal from power adder 31 is directed to each of mixers $80_1$ to $80_N$. At each of mixers $80_i$, the FDM predetermined carrier from associated oscillator $81_i$. The carrier frequency supplied by oscillator $81_i$ corresponds to the carrier for the channel fixedly assigned to the user $12_i$ associated with the separate fiber or lead of transmission medium 13 that is to propagate the output signal from mixer $80_i$ to that user. The output signal from each of mixers 80 includes the desired information signal within the same frequency band as the desired information signals from all other mixers and is then passed through an associated lowpass or narrow bandpass filter $82_i$ to remove any unwanted out-of-band signals. The output signal from filter $82_i$ then propagates along its associated fiber or lead in transmission medium 13 to the associated transceiver $12_i$ where the signal is detected in a detector 83 and delivered to the associated user. It is to be understood that any combinations of the arrangements of FIGS. 1, 2 or 6 can be implemented for practicing the present invention which provides a switching function without ever connecting or disconnecting wire or optical lines. The signals propagating through switch 10 can comprise either electrical or optical signals with appropriate circuitry being used for each element to function as described with such signal.

What is claimed is:

1. An arrangement for Frequency Division Multiplexed (FDM) switching of information signals in a communication system comprising N users wherein each user is assigned to receive information signals destined for that user over a separate one of N receive channels and to transmit information signals over a separate one of L transmit channels, where L≦N, the switching arrangement comprising:

means for receiving up to a plurality of L concurrent multiplexed information signals from a corresponding plurality of up to L active system users and for directing each of the up to L concurrently received information signals to a separate one of L output terminals, each information signal including a destination user's address which is different for each system user;

a plurality of L fixed paths for propagating up to L concurrent information signals through the switching arrangement, each path being connected to a separate one of the output terminals of the receiving and directing means and including;

means responsive to the signal information propagating on the path for (a) detecting the destination user's address included in the information signal propagating on the path and (b) generating a separate control signal representative of the detected destination user's address, and transmitting means responsive to the control signal from the detecting and generating means for converting the information signal propagating on the path to the FDM receive channel assigned to the destined user as indicated by the destination user's address detected in the information signal on that path for subsequent transmission of the signal to the destined user.

2. An FDM switching arrangement according to claim 1 wherein the switching arrangement further comprises:

a network monitor including means for receiving the information signals from each of the plurality of L paths, and for generating a separate information signal for a selected path, concurrent with the received information signal, which includes information to be inserted into certain portions of the information signal propagating in the selected path preceded and succeeded by a predetermined control code which is unique for the selected path; and each path further includes inserting means disposed before the transmitting means, the inserting means being responsive to the reception of the unique control code identifying the selected path, which precedes and succeeds the information to be inserted into an information signal propagating in the selected path, for inserting the information into that signal.

3. An FDM switching arrangement according to claim 2 wherein the inserting means comprises:

a plurality of L self-routing switches (SRS), where each SRS is disposed in a separate one of the plurality of L paths and comprises a first input connected to receive the information signal on the associated path, a second input connected to receive the information signals generated by the network monitor, and an output connected to both the transmitting means and the detecting and generating means, each SRS functioning to pass each information signal received at the first input and to overwrite any portion of the received information signal from the first input with the information disposed between the preceding and succeeding control code received at the second input when the control code corresponds to the unique code for the associated path.

4. An FDM switching arrangement according to claim 3 wherein each self-routing switch (SRS) comprises:

a first code switching means for detecting a first unique preceding and succeeding control code associated with each of the plurality of L paths disposed in a preamble section of each information signal received from the network monitor at the second input, and for inserting control information received at the second input, between the first unique preceding and succeeding control code, in place of the corresponding preamble information section received at the first input when the first control code corresponds to the unique first control code for the associated path; and a second code switching means for detecting a second unique preceding and succeeding control code associated with each of the plurality of L paths, which code is disposed adjacent the front and rear, respectively, of an overall information signal, for inserting the information signal from the network monitor in place of the packet of information signal received on the associated path when the second control code corresponds to the unique second control code for the associated path.

5. An FDM switching arrangement according to claim 4 wherein the network monitor is further capable of (a) detecting if the destination user's address in each received information signal is the address of an external network connection, and the routing such information signal to the external network, and (b) routing information signals received from the external network onto the proper one of the plurality of L paths by adding the second unique control code adjacent the front and rear of the information signal before transmission to the inserting means.

6. An FDM switching arrangement according to claim 3 wherein the information signal is an analog signal including control codes which are FDM tones, each self-routing switch comprising:

signal introduction means including filtering means for passing only a unique control signal tone assigned to the associated one of the plurality of L paths; and code switching means responsive to the unique control signal tone from the filtering means for inserting an information signal received from the network monitor in place of the information signal received from the associated path.

7. An FDM switching arrangement according to claim 6 wherein the self-routing switch further comprises:

second signal introduction means including
filtering means for passing only selected FDM control signal tones received from the network monitor, and
an adder for adding the FDM control tones passed by the filtering means to an information signal received on the associated path.

8. An arrangement for Frequency Division Multiplexed (FDM) switching of information signals in a switched communication system comprising N users wherein each user receives signals from the switching arrangement destined for that user over a separate link and transmits information signals over a separate link to the switching arrangement, the switching arrangement comprising:

a plurality of N fixed paths, each path being arranged for receiving information signals from a separate of one the N links from the N users, each received information signal including a destination user's address which address is different for each system user;

means responsive to the information signals on the plurality of N paths for (a) detecting the destination user's address included in each information signal on each of the paths, and (b) generating control signals representative of each detected destination user's address included in an information signal; and transmitting means responsive to the control signals from the detecting and generating means for converting each of the information signals propagating in the plurality of N paths to the FDM channel assigned to the user as indicated by the detected destination user's address in each of the information signals; and means for directing each of the converted information signals from the transmitting means onto the appropriate link associated with the destined user for transmission to that user.

9. An FDM switching arrangement according to claim 8 wherein the switching arrangement further comprises:

a network monitor including means for receiving the information signals from each of the plurality of N paths, and for generating a separate information signal for a selected path, concurrent with the received information signal, which includes information to be inserted into certain portions of the information signal propagating in the selected path, which information to be inserted is preceded and succeeded by a predetermined control code which is unique for the selected path; and each path further includes
inserting means disposed before the transmitting means which is responsive to the reception of the unique control code identifying the selected path which precedes and succeeds the information to be inserted into an information signal propagating in the selected path for inserting the information into that signal.

10. A Frequency Division Multiplexed (FDM) switched communication system comprising:

a plurality of N transceivers, each transceiver being associated with a separate user of the system and is assigned to receive information signals destined for the associated user over a separate one of N receive channels and to transmit information signals over a separate assigned one of L channels, where each information signal includes a destination user's address and L≦N; and an FDM switching arrangement comprising:
a plurality of L fixed paths for receiving and propagating up to L concurrent information signals received from the plurality of transceivers through the FDM switching arrangement, each path including;

means responsive to an information signal propagating in the path for (a) detecting the destination user's address included in the information signal and (b) generating a separate control signal representative of the detected destination user's address, and transmitting means, responsive to a control signal from the detecting and generating means, for converting the information signal received on the associated path to the FDM channel assigned to the user as indicated by the detected destination user's address for subsequent transmission to the destined user.

11. An FDM switched communication system according to claim 10 wherein the switching arrangement further comprises:

a network monitor including means for receiving the information signals from each of the plurality of L paths, and for generating a separate information signal for a selected path, concurrent with the received information signal, which includes information to be inserted into certain portions of the information signal propagating in the selected path preceded and succeeded by a predetermined control code which is unique for each of the plurality of L paths; and each path further includes
inserting means disposed before the transmitting means, the inserting means being responsive to the reception of the unique control code identifying the selected path, which precedes and succeeds the information to be inserted into an information signal propagating in the selected path, for inserting the information into that information signal.

12. An FDM switched communication system according to claim 11 wherein the inserting means comprises:

a plurality of L self-routing switches (SRS), where each SRS is disposed in a separate one of the plurality of L paths and comprises a first input connected to receive the information signal propagating on the associated path, a second input connected to receive the information signals generated by the network monitor, and an output connected to both the transmitting means and the detecting and generating means, each SRS functioning to pass each information signal received at the first input and to overwrite any portion of the received information signal from the first input with the information disposed between the preceding and succeeding control code received at the second input when the control code corresponds to the unique code for the associated path.

13. An FDM switched communication system according to claim 12 wherein each self-routing switch comprises:

a first code switching means for detecting a first unique preceding and succeeding control code associated with each path disposed in a preamble section of each information signal received from the network monitor at the second input, and for inserting the information received at the second input, between the first unique preceding and succeeding control code, in place of a corresponding preamble information section received at the first input from the associated path when the first control code corresponds to the unique first control code for the associated path; and a second code switching means for detecting a second unique preceding and succeeding control code associated with each path, which code is disposed adjacent the front and rear, respectively, of an information signal, for inserting the information signal from the network monitor received at the second input in place of the information signal received at the first input from the associated path when the second control code corresponds to the unique second control code for the associated path.

14. An FDM switched communication system according to claim 13 wherein the network monitor further comprises:

means for detecting if the destination user's address in each received information signal is the address of an external network connection and for routing such information signal to the external network connection; and means for routing an information signal received from the external network, and destined for a system user, to the inserting means after adding the second unique control code associated with the appropriate selected path adjacent the front and rear of the information signals before transmission to the inserting means.

15. An FDM switched communication system according to claim 12 wherein the information signal is an analog signal including control codes which are separate FDM tones, each self-routing switch comprising:

a signal introduction means coupled to the first input and including a filtering means for passing only a unique control code tone which is assigned to the associated path and is different for each of the other paths, and code switching means responsive to the unique control code tone received from the network monitor at the second input for inserting an information signal received from the network monitor at the second input in place of an information signal received from the associated path at the first input when the control code tone corresponds to the unique control code tone for the associated path.

16. An FDM switched communication system according to claim 15 wherein each self-routing switch further comprises:

a second signal introduction means including:

a filtering means for both receiving signals from the network monitor at the second input and passing only selected FDM control code tones in the received signal, and an adder for adding the FDM control code tones passed by the filtering means to an information signal propagating on the associated path and received at the first input.

17. An FDM switched communication system according to claim 10 or 11 wherein L=N and each user channel is transmitted to, and received from, the switching arrangement over a separate link, the switching arrangement further comprising:

means for directing each of the converted FDM information signals from the transmitting means onto the appropriate link associated with the destined user for transmission to that user.

18. An FDM switched communication system according to claim 17 wherein the directing means includes:

means for combining all concurrent FDM information signals from the transmitting means into a transmit FDM signal;

a plurality of N modulating means, each modulating means being (a) coupled to a separate one of the N links to the N users and (b) responsive to the transmit FDM signal from the combining means for modulating the transmit FDM signal with a separate one of N carriers to generate an output information signal including the associated destined user's information signal disposed within a predetermined channel frequency band for propagation over the associated link to the destined user.

19. An FDM switched communication system according to claim 18 wherein the directing means further includes:

a plurality of L filtering means, each filtering means being disposed at the output of a separate one of the plurality of N modulating means for passing only the predetermined channel frequency band including the destined user's information signal.

20. An FDM switched communication system according to claim 11 wherein, when L<N, the network monitor assigns a free one of the plurality of L transmit channels to a user becoming active and inserts an assigned transmit channel code representative of the assigned FDM transmit channel in an information signal transmitted back to the user's transceiver in the receive channel assigned to that user, and each transceiver includes a synthesizer for detecting a received assigned transmit channel code and for adjusting the transmitter to transmit subsequent user's packets in the transmit channel indicated by the assigned transmit channel code while the user is active.

21. An FDM switched communication system according to claim 10 wherein, when L=N, each transceiver is fixedly assigned to transmit packets from an associated user only over a predetermined FDM transmit channel.

* * * * *